Oct. 18, 1966    R. A. EKSTROM, JR    3,279,956
FLEXIBLE LEAF SPRING SURFACE TEMPERATURE THERMOCOUPLE
Filed June 14, 1962    2 Sheets-Sheet 1
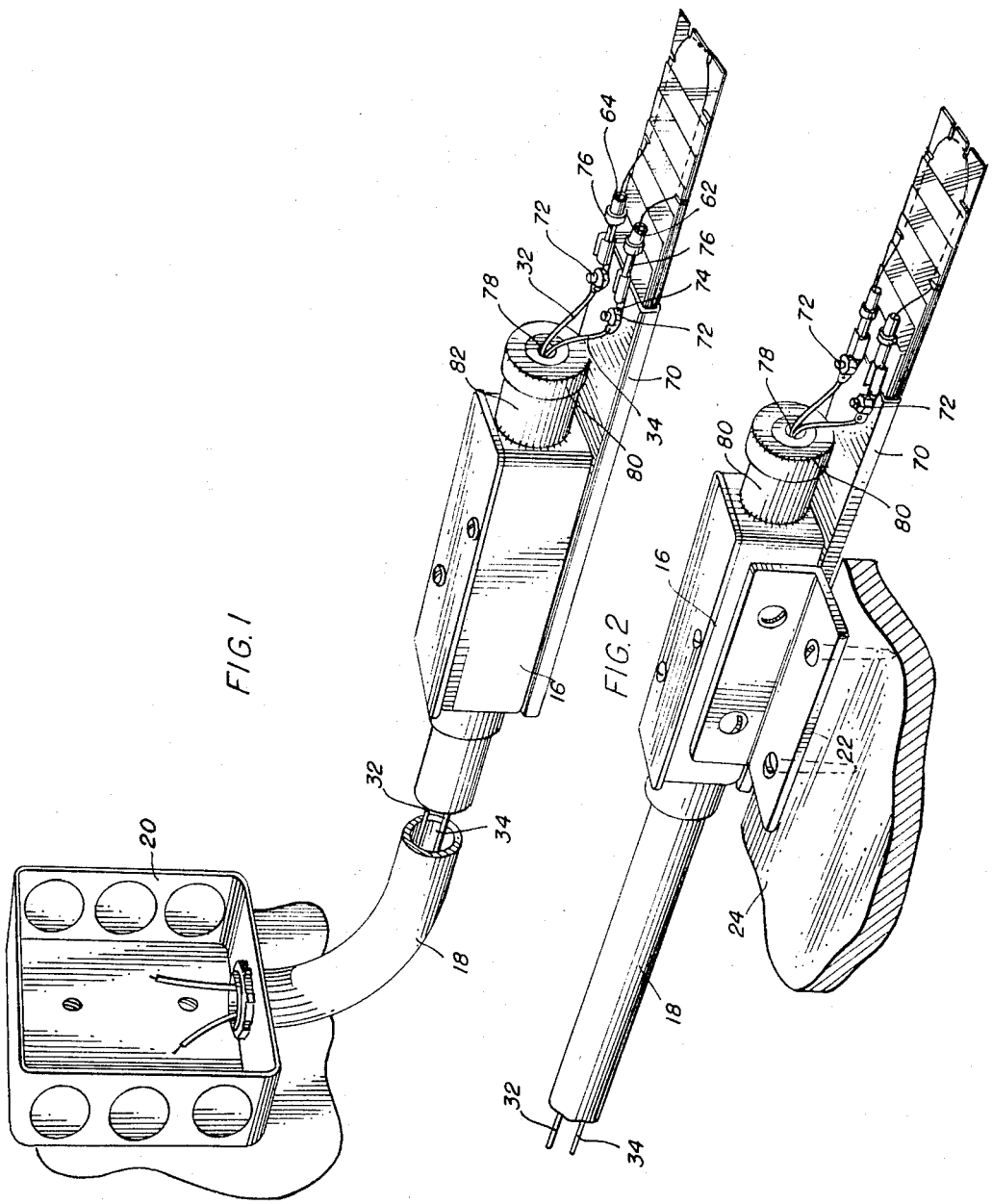
INVENTOR:
REGNER A. EKSTROM, JR.
BY
Kent W. Worrall
ATT'Y

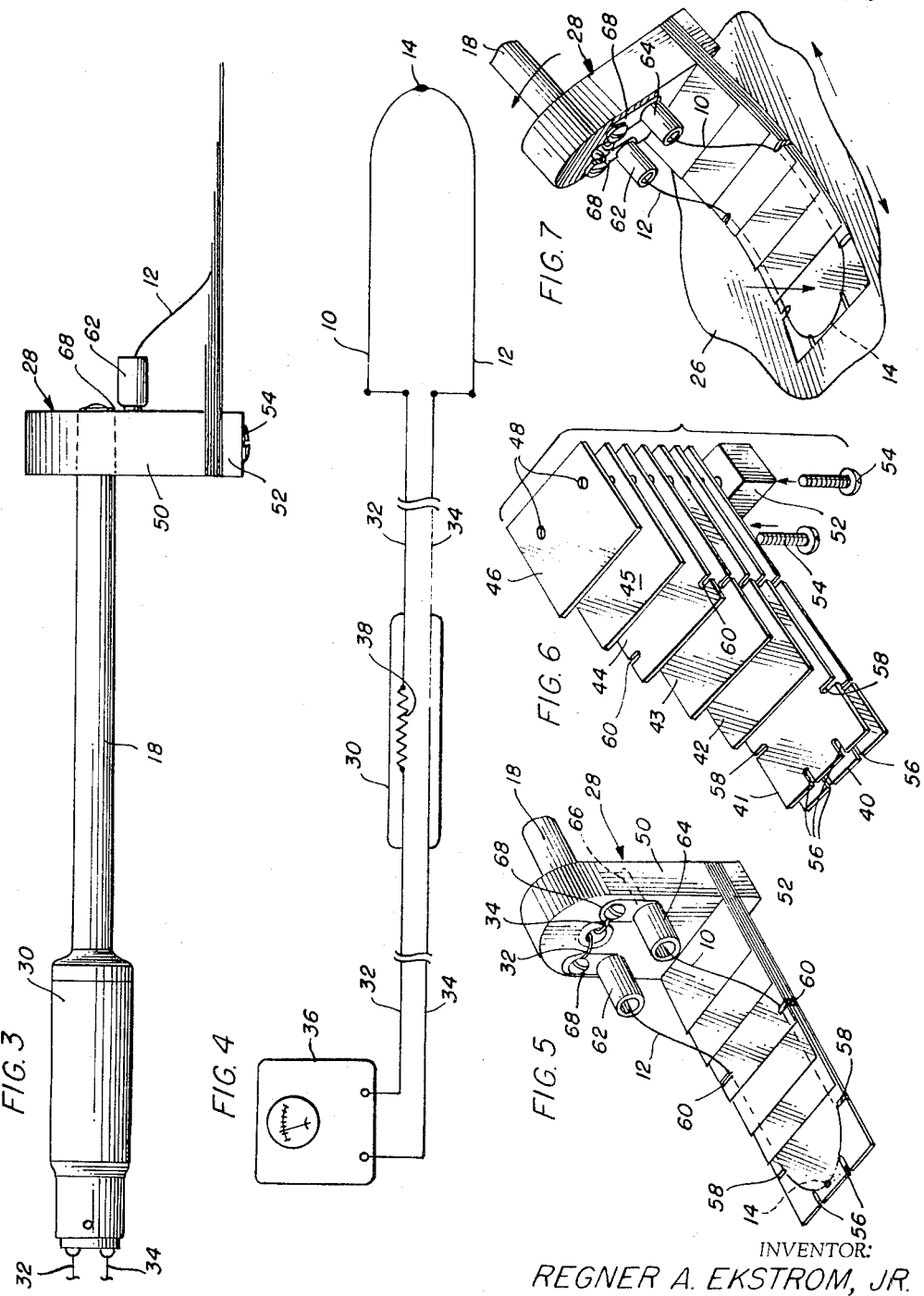

United States Patent Office 3,279,956
Patented Oct. 18, 1966

3,279,956
FLEXIBLE LEAF SPRING SURFACE TEMPERATURE THERMOCOUPLE
Regner A. Ekstrom, Jr., 15555 Millard Ave., Markham, Ill.
Filed June 14, 1962, Ser. No. 202,597
4 Claims. (Cl. 136—221)

This invention relates generally to the measurement of surface temperatures of metallic and non-metallic materials employing the well known principles of the variation of different metals subjected to the same heat to cause differing electrical potentials which may be noted and calibrated for measurement.

The invention covers special conditions of the surfaces such as smooth, rough, abrasive, light reflective or light absorptive and whether the surface is dry or wet, such as those coated with wet paint or wet ink; and even more delicate surfaces covered with photographic film, plastic films, molten vitreous enamels, and the like.

A number of different bi-metallic groups are used for noting different temperatures among which may be an iron constantan pair for normally measuring temperature up to 1800° F.; a Chromel constantan pair up to about 1500° F.; a copper constantan pair up to about 800° F.; and a Chromel Alumel pair up to about 2400° F.

An important object of the invention is to subject a wire thermocouple to the surface temperature of an article with the surface without coming in destructive contact with the surface itself.

A further object of the invention is to subject a juncture of the wire thermocouple to a surface which is rough or smooth, moving or stationary in such close relation thereto as to receive the indicated heat closely therefrom.

A further object of the invention is to mount a thermocouple for fixed and ambient movement relative to a heated surface without coming in direct contact therewith and therefore not subject to a destructive frictional engagement therewith.

A still further object of the invention is to so mount the wire thermocouple with relation to a material whose temperature is to be observed, that the wires and not the supporting fixture will be located closely adjacent the surface to be measured, but not in direct contact therewith.

Still a further object of the invention is to provide a mounting for thermocouple wires in which the wire elements themselves may be quickly changed, repaired, connected and disconnected for heating action.

A further object of the invention is to provide an electro-responsive means for noting and indicating the variations produced in any thermocouple by a heated surface and providing means for calibrating these results to indicate the heat to which the thermocouple is exposed.

Other and further objects of the invention will appear in the specification and will be apparent from the accompanying drawings, in which:

FIG. 1 is a perspective view of a fixture in accordance with this invention having a resilient applicator of flexible non-consumable material such as mica and applied to a fixed and somewhat remote supporting connection.

FIG. 2 is a perspective view of a similar fixture having a permanent attachment closer to the applicator for supporting a permanent head.

FIG. 3 is a side elevation of an applicator somewhat similar to that of FIG. 1 but having a reduced applicator head and a manual supporting plug at a suitable distance from the applicator.

FIG. 4 is a somewhat diagrammatic view of the electrical connections of the applicator wires to an electro-responsive device such as a millivoltmeter.

FIG. 5 is a perspective assembly view of the flexible applicator.

FIG. 6 is a perspective blown-up portion of the blades shown in FIG. 5; and

FIG. 7 is a perspective inclined position of the applicator as shown more clearly in FIG. 5.

In general, the fixture is relatively movable to the surface whose temperature is to be measured. Some surfaces require a more flexible application than others; some surfaces are directly contacted by a portion of the fixture, but in some cases, the thermocouple wires are spaced or protected from direct engagement with the surface to be measured, but located close thereto so that the radiation of direct and close heat surfaces may be obtained and recorded with the least heat loss, and therefore with the greatest efficiency.

In this invention, a pair of thermocouple wires 10 and 12 are connected in a common heat joint 14 which extends into a box or head 16 with a conduit 18 leading therefrom to a wall mounted or fixture box 20 for a permanent installation from the box 16 as shown in FIG. 2, may be directly connected by a bracket 22 to a fixed portion of the frame 24 near a movable surface 26 as shown in FIG. 7 whose temperature is to be measured.

This same fixture may be mounted in a head 28 as shown in FIG. 3 connected by a conduit to a plug or handle 30 for manually moving the head and the thermocouple adjacent and relative to a surface whose temperature is to be measured. The handle has electrical connections 32 and 34 with an electro-responsive meter 36 having a calibrated dial and usually of the millivoltmeter type which may require a resistance 38 in either one or both of the wires.

The thermocouple holder comprises a plurality of thin sheets 40, 41, 42, 43, 44, 45, 46 of a flexible elastic and heat resistant material such as mica, which are graduated in length, very thin and not easily subject to abrasion or destruction. One end of each of these sheets is formed with perforations 48 by means of which the sheets may be clamped together between the top 50 and bottom 52 of a head fitting by means of screws 54 so that each of the longer sheets extend outwardly and overlaps each of the other sheets. These two outermost sheets 40 and 41 are preferably of the same length and dimensions having end slots 56 spaced apart and lateral slots 58 spaced from the ends but not covered by the next mica 42. The sheets extend outwardly from the holder in cantilever fashion.

Also a number of the other mica sheets as 42, 43 and 44 may be formed at their edges with side slots 60 which register with each other when the mica sheets are assembled so that a thermocouple wire 10–12 may be threaded through the side slots 60 until after the second sheet 41 may be brought upwardly through the slots 58 to the top of sheet 41 and the loop extremity of the thermocouple may be threaded downwardly through the end loops 56 resting upon the extremity of the lower sheet 40 and thus carried in an exposed position between the bottom sheet 40 and the next sheet 41.

The other ends of the wires 10 and 12 may be connected to plugs 62 and 64 each having a metal extremity 66 inserted through a metal contact plate 68, each contact plate is secured to the outer face of the top 50 of the head and from there conductor 32 and 34 extend through a conduit 18 as connected to the head 28 for making an indicating electrical connection.

The head 28 of the invention as shown by FIGS. 3–7 is preferably in an upright or right angled position with respect to the mica application sheets which extend outwardly therefrom in cantilever fashion, but they may also be held in clamped position as shown in FIGS. 1 and 2 by their relation to a base plate 70 to which the mica sheets are clamped together and secured by bolts 72 which also secure metal contact plates 74 (similar to the plate 76) on top of the base plate 20, and into which contact stems 76 are connected to contact plug 64. Connected to metal contact plate 74, wires 32 and 34 extend through a central opening 78 in a cap 80 applied to a threaded extension 82 of a condulet or fixture box 16 which is in turn connected to a conduit 18.

In this construction, the looped connection of the thermocouple wires is disposed between mica plates 40 and 41 being held in this location by threading the connected wires 10, 12 through the end slots 56 in the upper sheet 41, but not through the lower sheet so that the wire and particularly the sensitive joined extremity thereof is separated from a material 26 as engaged thereby an amount equal at least to the thickness of the outermost mica sheet 40.

In the application of these flexible sheets to a moving surface 21, it may be necessary if the fixture is applied manually to depress or spring the mica sheets as shown in FIG. 7, and also the permanent fixtures attached to a frame 24 or to a fixture box 20 may also be similarly inclined at the end to engage a movable surface 26. In either case, the pressure is downward at the outer end of the mica sheets as indicated by the arrow in FIG. 7, but even in this position, the outermost loop of the measuring thermocouple wire does not need to engage a material whose temperature is to be measured and therefore a resistance as 38 may be inserted to take care of the K-factor or the heat loss. In any fixture, the position of the recording thermocouple juncture 14 is so close to the surface to be measured, that there is no substantial loss of radiant heat, and a meter 36 is calibrated to show the degree of heat transferred by the surface.

Mica leaves form an ideal support for the almost perfect elasticity of glass; it does not soften under heat and withstands very high temperatures for short periods of time without deterioration. At 1400° F. and thereabouts, it operates without physical change for very long periods of time, and at the medium high temperature of 600° F. operates without chemical or physical change. Because of this elasticity and light weight, the filament thermocouple it supports, makes a touch contact with a surface without appreciable loss of heat by conduction to the mica, and with very little mechanical pressure, it makes a good physical contact with the surface.

So perfect is this touch contact with a No. 40 wire gage filament thermocouple, that the filament wires comprising the thermocouple will attain the temperature of the heated surface almost instantly, which makes it among the fastest responsive thermocouples known at this time. The speed of this fixture is further explained by having the thermocouple filament wires approximately eight inches from terminal to terminal, which means that the heat connection loss along the wire is practically nothing.

The filament thermocouple terminates in plug terminals as 62 and 64 in FIG. 5 which are inserted through metal contact plates 68 from which conductors extend to a pyrometer indicator such as a meter 36 or one of the other meters as shown in the application.

This plug and socket arrangement permit the filament of thermocouple to be quickly changed or replaced when it wears out, suffers mechanical damage, or is replaced in use.

Other reasons for a quick disconnection of the filament thermocouple is to interchange it with thermocouples of heavier or lighter gage wire which varies the time response of the thermocouple fixture. In practice, the response may actually be too fast for an application which requires a slower, heavier gage wire thermocouple. Extreme speed of response is desirable because there are many cumbersome mechanical surface fixtures on the market which are aggravatingly slow in response. If a filament thermocouple is in contact with a rough cast metal surface, the delicate filament wire will snag and break. Therefore a heavier construction is desirable.

With these constructions, the thermocouple fixture is designed and intended to be used in close proximity to and in wiping contact with the materials whose temperature is to be measured, the materials may be stationary and the fixtures moved over them in some cases, or the fixtures may be fixed in position and the materials to be measured may be moved; and some of the fixtures are sufficiently light and portable that they may be manually applied to and directly in contact with materials which are fixed, and to those which are movable.

Although a specific fixture construction is herein shown and described in some detail, applied close to and in wiping engagement with a surface material, it should be regarded as an illustration or example of the invention, since various changes in the construction, combination and arrangement of the parts may be made without departing from the spirit and scope of the invention.

I claim:

1. In combination, a thermocouple and mounting fixture therefor, comprising: a mounting head including electrical connections; a plurality of individual and flexible sheet means of high temperature resistant and abrasion resistant material stacked adjacent one another, said plurality extending outwardly in cantilever configuration from said mounting head for lying in close proximity to a high temperature surface whose temperature is to be measured and for forming a supporting protective shield relative thereto, said plurality including an outermost sheet, said plurality also including another sheet having first and second separated wire-threading means therein, at least one of said sheets positioned between said head and said outermost sheet being shorter than said outermost sheet; means for attaching said individual and flexible sheet means in their stacked relationship to said mounting head; and a thermocouple forming a wire loop and being both supported and protected by said flexible sheet means and comprising a pair of wires of different metal joined together between said outermost sheet and said another sheet and also between said first and second separated wire-threading means, each of said pair being threaded through a different one of said wire-threading means and extending back to the electrical connections whereby the temperature of said heated surface can be determined without injury to the thermocouple.

2. A thermocouple mounting fixture for supporting and protecting a thermocouple from injurious contact with a heated surface whose temperature is to be measured, said thermocouple comprising a pair of dissimilar wires having joined ends, said fixture comprising: a mounting head; a plurality of individual and thin sheets of mica stacked together in sandwich fashion for providing a protective support for said thermocouple, said plurality extending outwardly from one end thereof at said mounting head to a furthermost end disposed away from said mounting head, said plurality including sheets of graduated length extending different distances outwardly to provide variable flexibility therealong, said plurality also including a relatively long outermost sheet normally positioned adjacent said heated surface, and also including another sheet stacked adjacent said outermost sheet and having spaced apart mounting means for supporting each of said pair of wires in a separated position and permitting their joined ends to lie between said outermost sheet and said another sheet to protect same; and fastening means for rigidly attaching the one end of said plurality to said mounting head to thereby maintain their relative alignment.

3. The thermocouple mounting fixture as defined in claim 2, wherein said fastening means are removable to permit replacement of parts in the event of injury thereto.

4. In a thermocouple fixture, the combination with a heated surface of which the temperature is measured, means forming a head supported in proximity with the heated surface, thermocouple wires in the head, flexible leaf spring means carried by the head in which the wires are located, said flexible leaf spring means comprising protective supporting means for the thermocouple wires, both the flexible leaf spring means and the wires being angularly deflected under the application of pressure to engage the heated surface at an inclination thereto, said flexible leaf spring means comprising a plurality of mica strips in which the wires are disposed, the strips extending from the head so that they may be flexed to accommodate the fixture to a movable surface and the wires being disposed between outermost strips of the mica so that they will be close to the surface of the material to be measured, but will not be in actual contact with the surface regardless of any relative movement therebetween, said plurality of flexible strips of mica varying in length and attached at commonly disposed ends so that the strips terminate at different distances from the head, a pair of removable wire plugs connected to the head, the wires extending therefrom and between the mica strips and also between registering side slots and end slots in the strips for threading the wires therein between the strips so that they will not contact directly with the surface engaged by the outermost strip.

References Cited by the Examiner

UNITED STATES PATENTS

| | | | |
|---|---|---|---|
| 1,241,496 | 10/1917 | Chubb | 136—4.4 |
| 1,289,116 | 12/1918 | Chubb | 136—4.4 |
| 1,883,444 | 10/1932 | Albert | 136—4.4 |
| 2,161,370 | 6/1939 | Mears | 136—4.4 |
| 2,422,124 | 6/1947 | Obermaier | 136—4.4 |
| 2,677,711 | 5/1954 | Ray | 136—4.62 |
| 2,991,654 | 7/1961 | Engelhard | 136—4.4 |

OTHER REFERENCES

Hartree, W.: "The Measurement of Small Rates of Heat-Production," in Journal of Scientific Instruments, vol. 1, pages 265–72 (1924).

WINSTON A. DOUGLAS, *Primary Examiner.*

JOHN H. MACK, *Examiner.*

A. M. BEKELMAN, *Assistant Examiner.*